United States Patent [19]

Ray

[11] Patent Number: 5,037,067
[45] Date of Patent: Aug. 6, 1991

[54] HIGH PRESSURE ROTARY PLUG VALVE

[75] Inventor: Thomas E. Ray, Beavercreek, Oreg.

[73] Assignee: Artek Industries, Inc., Tigard, Oreg.

[21] Appl. No.: 604,977

[22] Filed: Oct. 29, 1990

[51] Int. Cl.⁵ .............................................. F16K 5/04
[52] U.S. Cl. .................................... 251/314; 251/900
[58] Field of Search ............... 251/309, 314, 317, 900

[56] References Cited

U.S. PATENT DOCUMENTS

| | | | |
|---|---|---|---|
| Re. 30,224 | 3/1980 | Ortega | 137/625.47 |
| 3,991,975 | 11/1976 | Sibrava | 251/317 |
| 4,010,930 | 3/1977 | Sands | 251/314 |
| 4,262,880 | 4/1981 | Danko et al. | 251/288 |
| 4,577,870 | 3/1986 | Scott et al. | 251/900 X |
| 4,705,075 | 11/1987 | Ray | 137/625.47 |

Primary Examiner—John C. Fox
Attorney, Agent, or Firm—James D. Givnan, Jr.

[57] ABSTRACT

The two-way and three-way plug valves disclosed include plug members having O-rings in place in continuous grooves defined by inner and outer side walls and a bottom wall extending therebetween. Recesses are formed at spaced apart points along the O-ring groove inner wall to provide an area into which segments of the O-ring may be displaced during existence of a pressure differential across the O-ring. The O-ring groove inner wall recesses are in fluid communication with one another by means of passages, bores and channels defined by the plug member. Edges along the recesses frictionally engage O-ring segments to restrain same against displacement from the O-ring groove.

6 Claims, 2 Drawing Sheets

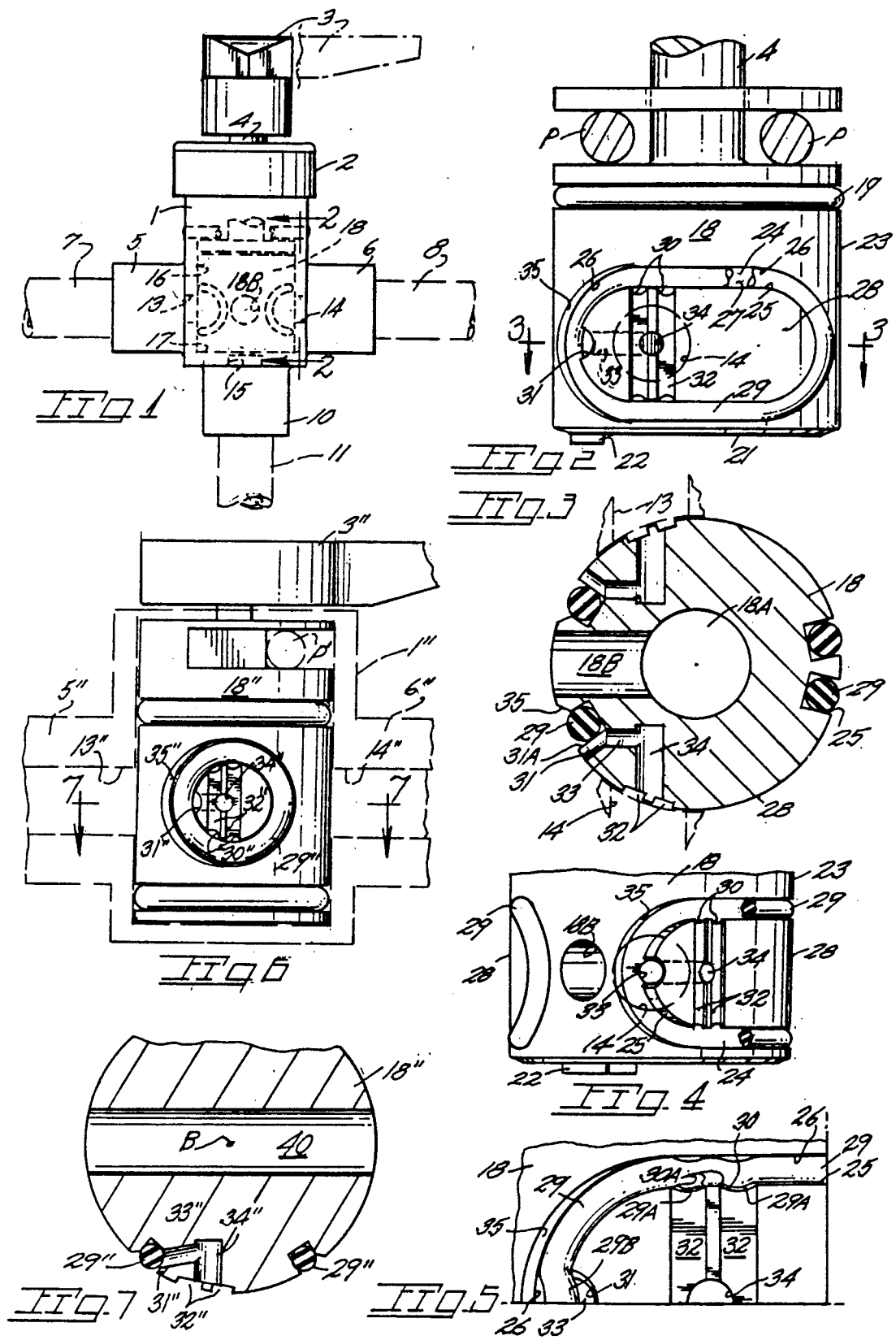

HIGH PRESSURE ROTARY PLUG VALVE

BACKGROUND OF THE INVENTION

The present invention concerns O-ring equipped plug valves for use in high pressure systems.

In existing plug valves a problem exists in keeping their circular, endless seals, termed O-rings, seated in plug defined grooves when controlling fluid flows of several hundred PSI. A pressure differential across an O-ring will cause same to be at least partially displaced from the groove to the extent it is susceptible to being damaged or clipped upon passage across an edge of a port in the valve housing.

In an attempt to prevent such O-ring displacement and resulting damage, various plug configurations have been proposed. U.S. Pat. No. 3,991,975 discloses a plug with an O-ring groove defined by side walls and a bottom wall with the side walls having notches therein to reduce a pressure differential across the O-ring. Reissued patent U.S. Pat. No. Re. 30,224 discloses a plug valve with O-ring receiving grooves having inwardly directed shoulders therealong to retain an O-ring against outward displacement. U.S. Pat. No. 4,262,880 discloses a plug valve wherein port edges in a valve housing are chamfered to reduce O-ring clipping. Further, a channel is shown extending partially about the plug external wall to minimize pressure surges from trapped downstream fluid to avoid O-ring displacement.

Plug valves equipped with O-rings when used for controlling high pressure flows of several hundred PSI have a reduced life by reason of O-ring failure resulting from momentary O-ring displacement whereat it is subject to damaging contact with a port edge of a valve seat.

SUMMARY OF THE PRESENT INVENTION

The present invention is embodied in the rotatable plug member of a plug valve having novel construction directed toward keeping an O-ring seal seated against pressure differentials.

The present plug valve utilizes a plug member having one or more O-rings mounted in a recessed manner in a continuous groove or grooves. Normally the O-ring is more or less uniformly compressed by biased contact with the internal wall or seat of the valve housing. A seal is accordingly provided to isolate a downstream line. Passage of an O-ring segment across a port in the valve housing results in the segment being susceptible to displacement into the port and eventually undesired wiping contact with a port edge.

During investigation of this problem and proposed solutions, it has become apparent that O-ring life may be extended by modification of the plug member by the formation of recesses along an O-ring receiving groove and the providing of fluid communication between same. O-ring displacement by a pressure differential thereacross and resulting ring abrasion is thereby diminished. Fluid communication between the recesses may be internal passages formed in the plug member and a channel along the plug exterior which terminates at an O-ring groove. Such channels may be utilized in conjunction with internal passages in the plug member to provide communication between widely spaced groove recesses. Intersecting bores in a plug member may also serve to communicate the recesses.

Important objectives include the provision of a plug valve having a plug member with an O-ring receiving groove wherein recesses are provided at spaced apart points along a groove wall with provision made for communicating the recesses with one another for the purpose of maintaining an O-ring seated in its groove to avoid damaging contact with a valve housing; the provision of a plug valve having a plug member with a groove for the reception of an O-ring with the groove having recesses spaced therealong in fluid communication with one another by means of open plug member defined passageways including bores, channels, etc.; the provision of communicating recesses in an O-ring groove having edges against which the O-ring may be drawn to inhibit outward ring displacement.

BRIEF DESCRIPTION OF THE DRAWINGS

In the accompanying drawings:

FIG. 1 is a front elevational view of a plug valve embodying the present invention;

FIG. 2 is a vertical elevational view taken along line 2—2 of FIG. 1 showing a plug member enlarged and removed from the valve housing;

FIG. 3 is a horizontal sectional view taken downwardly along line 3—3 of FIG. 2;

FIG. 4 is a fragmentary elevational view of the plug member of FIG. 2 rotated about is vertical axis approximately forty-five degrees to illustrate plug member details;

FIG. 5 is an enlarged fragmentary view of a plug member made in accordance with the present invention and showing an O-ring subjected to a pressure differential;

FIG. 6 is an elevational view of a two-way plug valve with the valve housing shown in phantom lines;

FIG. 7 is a horizontal view taken downwardly along line 7—7 of FIG. 6;

DETAILED DESCRIPTION OF THE PREFERRED EMBODIMENTS

Figure 8:
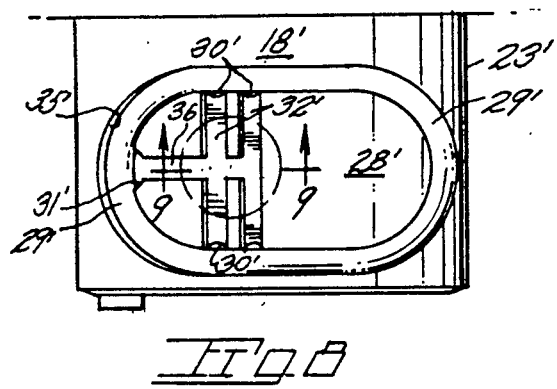
FIG. 8 is a fragmentary elevational view similar to FIG. 2 but showing a modified form of plug member.

With continuing attention to the drawings wherein applied reference numerals indicate parts similarly hereinafter identified, the reference numeral 1 indicates a valve housing provided with a suitably attached cap 2.

A handle 3 is carried by a stem 4 of a later described plug member. Valve housing bosses at 5 and 6 receive outlet lines at 7 and 8 while a bottom wall boss 10 receives an inlet line 11 serving the three-way valve. Valve housing ports at 13 and 14 provide communication between the valve housing interior and the outlet lines 7 and 8. A bottom wall port 15 of a valve housing serves to communicate inlet line 11 to the later described plug member. Housing internal walls 16 and 17 constitute a valve seat. The outlet ports 13 and 14 of the valve housing are common to a plane offset from a medial vertical plane of the following described plug member as best described in U.S. Pat. No. 4,705,075.

A plug member 18 has a central opening 18A serving an outlet port 18B and includes the earlier mentioned stem 4. Said plug member is of a diameter for a snug fit with the valve seat wall surfaces of housing 1. A seal 19 extends about the plug member while pins P retain same seated in the housing. A bottom wall 21 of the plug member carries a tang 22 which moves arcuately into contact with abutments on the housing bottom wall to limit arcuate movement of the plug member.

As FIG. 2 is a mirror image of the unseen side of plug member 18, a description of the viewed side of the plug member will also be applicable to the remaining or unseen side. An outer circumferential wall 23 of the plug member defines an O-ring receiving groove at 24 by means of inner and outer groove walls 25 and 26. The O-ring or continuous seal is at 29. The O-ring groove and walls are continuous except as later explained. A groove bottom wall is at 27. A plug member surface area 28 is defined by O-ring groove 24. Inside wall 25 of groove 24 has recesses as at 30 along a straight segment of O-ring wall 25 while an additional recess at 31 is formed in a curved segment of inner wall 25. The recesses 30 in wall 25 are in communication by means of channels as at 32 which extend across surface area 28 of plug member wall 23. Each recess 30-31 terminates at a pair of edges as at 30A which are perpendicularly orientated to the O-ring segment in place thereon. For communicating wall recess 31 with recesses 30, a passage 33 is provided within the plug member. Said passage terminates inwardly in communication with a bore 34 extending inwardly into the plug member through channels 32 on the plug member exterior. Accordingly, recess 31 in groove inner wall 25 is in communication with inner wall recesses 30.

The recesses 30 and recess 31 in O-ring wall 25 in the presence of a pressure differential across the O-ring serve to admit flexed or deformed segments 29A-29B of the O-ring to inhibit outward displacement of the O-ring to thereby avoid subjecting the O-ring to damaging contact with the edge of housing port 14. Passage 33 and bore 34 serve to communicate the recesses along with channels 32. A low pressure may be associated with surface area 28 of the plug member by reason of a reduced pressure in outlet line 8 or from fluid turbulence occurring proximate a partially open or closed plug member port 18B, served by plug member opening 18A, during opening and closing of movement of the plug member. A chamfer at 35 on outer groove wall 26 may aid in the avoidance of seal damage.

Figure 9:
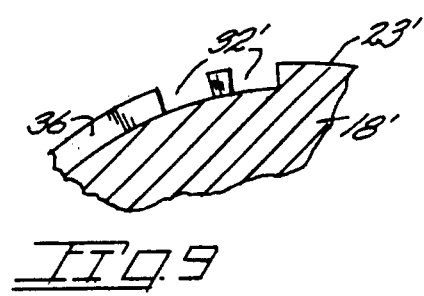
FIG. 9 is a horizontal sectional view taken along line 9—9 of FIG. 8.

In FIGS. 8 and 9, a modified plug member is indicated at 18' with features identified by prime reference numerals which correspond to base reference numerals applied to analogous features of the first described plug member. In the modified plug member, internal passage 33 and bore 34 of the first described plug member are dispensed with and an intersecting channel at 36 provided to communicate recesses 30' and 31'.

The present invention may be embodied in a two-way valve as illustrated in FIGS. 6 and 7 wherein double prime reference numerals indicate features similar to those earlier identified with base reference numerals in the first described form of the invention. In the two-way valve shown, the housing bosses at 5" and 6" and the ports or openings therein at 13" and 14" for inlet and outlet lines may be formed medially of a vertical plane containing the axis B (FIG. 7) of a plug member 18". Plug member 18" includes a transverse opening 40 to communicate housing openings 13" and 14" when the valve is open. An O-ring 29" serves to close port 13" or port 14" by concentric positioning about either of said ports. Upon such positioning of O-ring 29", the transverse passage 40 of the plug member will, of course, be perpendicularly disposed to its open position shown in FIG. 6. Communication between recesses 30" and 31" may be as shown via passage 33" and bore 34" or alternatively via a cross channel as at 36 in the first described modified form of the plug member.

While I have shown but a few embodiments of the invention, it will be apparent to those skilled in the art that the invention may be embodied still otherwise without departing from the spirit and scope of the invention.

What is desired to be secured in a Letters Patent is; I claim:

1. A plug valve comprising,
   a housing having internal walls providing a valve seat defining an inlet port and at least one outlet port,
   a plug member in said valve seat and having an external cylindrical wall surface, a continuous groove in said wall surface, an O-ring in said groove in biased contact with the valve seat for closing said outlet port of the housing when located thereabout, said plug member defining an open area in communication with the inlet port of the housing and selective communication with said outlet port of the housing, said continuous groove defined by plug member inner and outer walls and a contiguous bottom wall, said inner wall defining recesses, fluid pressure communicating means located interiorally of said groove and extending between said recesses and serving to subject O-ring segments located proximate said recesses to displacement toward said recesses in the presence of a pressure differential across the O-ring.

2. The valve claimed in claim 1 wherein said fluid pressure comminicating means includes a bore in said plug member.

3. The valve claimed in claim 1 wherein said fluid pressure communicating means includes multiple bores in said valve body.

4. The valve claimed in claim 2 wherein said fluid pressure communicating means additionally includes a channel formed in the exterior wall surface of the plug member.

5. The valve claimed in claim 3 wherein said bores intersect one another, one of said bores in direct communication with said channel.

6. The valve claimed in claim 1 wherein said fluid pressure communicating means are channels in said external wall surface of said plug member.

* * * * *